May 19, 1970   E. C. ADAMS   3,512,600
FUEL MEASURING SYSTEM FOR VEHICLES
Original Filed March 21, 1966   2 Sheets-Sheet 1

INVENTOR.
EARL C. ADAMS
BY *Eugene M. Eckelman*
ATTORNEY

May 19, 1970  E. C. ADAMS  3,512,600
FUEL MEASURING SYSTEM FOR VEHICLES
Original Filed March 21, 1966  2 Sheets-Sheet 2
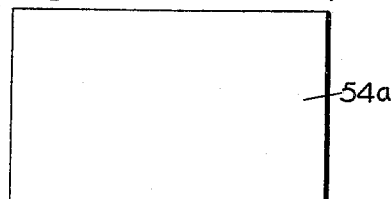
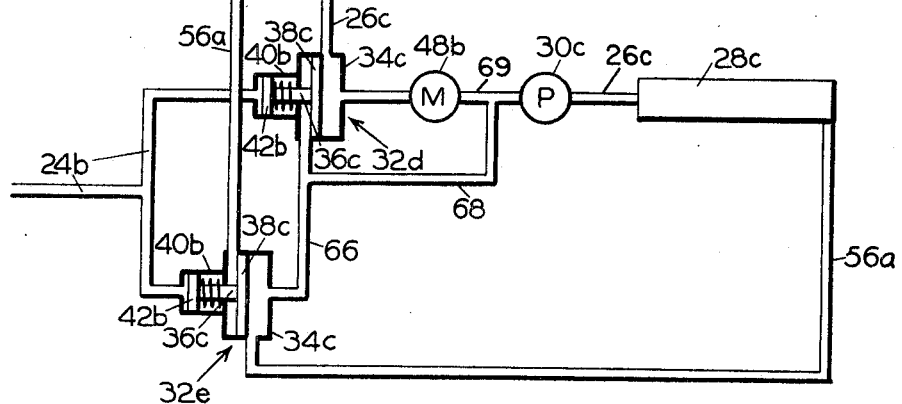
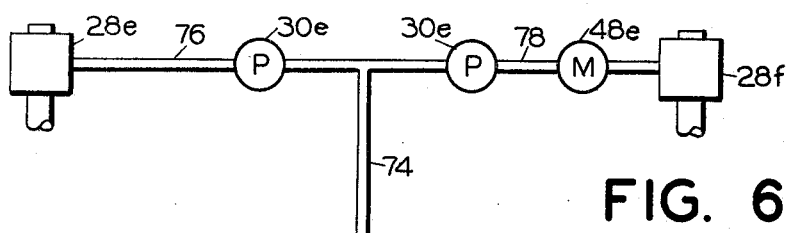
INVENTOR.
EARL C. ADAMS
BY Eugene M. Eichelman
ATTORNEY

United States Patent Office 3,512,600
Patented May 19, 1970

3,512,600
FUEL MEASURING SYSTEM FOR VEHICLES
Earl C. Adams, Beaverton, Oreg., assignor to Systems Corporation, Portland, Oreg., a corporation of Oregon
Continuation of application Ser. No. 536,048, Mar. 21, 1966. This application May 8, 1968, Ser. No. 733,210
Int. Cl. B60k 15/02
U.S. Cl. 180—77                     6 Claims

ABSTRACT OF THE DISCLOSURE

A bypass fuel line is connected to the main fuel line of a vehicle for measuring fuel which is used by the engine in off-highway positions or other conditions where the fuel used is non-taxable. A valve is eemployed and is operated by means which regulate operation of the vehicle in off-highway positions, such as by the emergency brake or a power take-off. Embodiments of the invention employ fuel return lines between the fuel mixing device of the engine and a fuel tank. In further embodiments means are provided for measuring the flow of fuel consumed by the fuel mixing device when the vehicle is in an off-highway position.

---

This application comprises a continuation of application Ser. No. 536,048, filed Mar. 21, 1966, for Fuel Measuring System for Vehicles and since abandoned.

This invention relates to a fuel measuring system for vehicles.

As is well known, most states and the Federal Government have provisions for refunding the fuel tax on gasoline and other fuels which are used in vehicles operated on private property and on other than state or Federal highways. While hauling vehicles, for example, consume a substantial quantity of gasoline which is taxable, they also consume a substantial quantity of gasoline which is not taxable such as in off-highway use or by auixiliary motors carried thereon. It is of course difficult to estimate the amount of gasoline used during the time the truck is off the highway, and the various tax commissions involved are reluctant to accept the estimates given. It has been found, however, that the tax commissions will accept gallonage figures measured automatically by an accurate measuring system which comes into operation during the time that the vehicle is parked with its emergency brake set or during the time that a power take-off of the vehicle is activated, or which in any way measures fuel used by the vehicle engine or an auxiliary engine which is non-taxable. It is accordingly a primary objective of the present invention to provide a measuring system of the type described which is placed in operation by shiftable vehicle operating control means such as the emergency brake or a power take-off of the vehicle.

A more particular object is to provide a fuel measuring system of the type described which utilizes valve means arranged to shunt fuel flow through a metering device upon the operation of shiftable vehicle operating control means.

Many working vehicles operating on the highways utilize diesel engines which as is well known employ return means from the fuel injector for the purpose of recovering fuel not burned, and it is another object of the present invention to provide fuel measuring means which is embodied in the fuel system such that an accurate measure is taken only of fuel burned in the engine, and furthermore to provide such a system which is placed in operation automatically by the activation of shiftable vehicle operating control means.

Still another object is to provide, in a vehicle of the type having a vehicle operating engine and an auxiliary engine, fuel metering means for measuring the consumption of fuel by the auxiliary engine.

Additonal objects will become more apparent from the following specification and claims, considered together with the accompanying drawings, wherein the numerals of reference indicate like parts, and wherein:

FIG. 4 is a diagrammatic view of a fuel measuring system of the type shown in FIG. 3 but illustrating a second embodiment;

FIG. 5 is a diagrammatic view of a fuel measuring system as in FIGS. 3 and 4 but showing still another embodiment; and FIG. 6 is another form of the invention utilized on a vehicle employing a pair of engines one of which is for driving the vehicle and the other of which is an auxiliary engine and the fuel consumption of which is to be metered.

Figure 1:
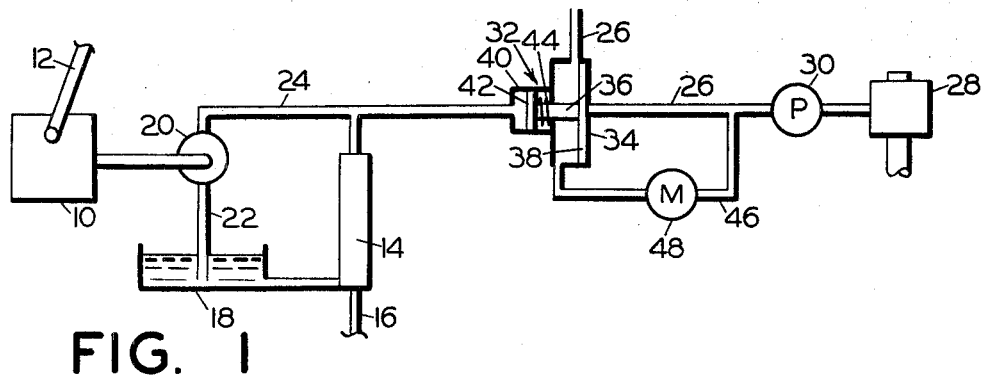
FIG. 1 is a diagrammatic view of a first form of the present fuel measuring system wherein valve mechanism is operated by fluid activated shiftable vehicle operating control means.

Referring now in particular to the drawings and first to FIG. 1, there is shown a first form of the invention as Referring now in particular to the drawings and first to fluid or mechanical operated power take-off 10 controlled in its operation by operating lever means 12. In this type of power take-off, a fluid operated, two-way cylinder 14 is employed having a projecting piston rod 16 which is connected to means to be driven by the power take-off. In a fluid drive system as shown, there is employetd a fluid reservoir 18, a fluid pump 20, an inlet conduit 22 extending from the reservoir to the pump and an outlet conduit 24 extending from the pump to the cylinder 14.

Conventional fuel feed means for vehicles are also shown and comprise a fuel line 26 leading from a fuel tank, not shown, to a fuel mixing device 28 such as a carburetor or injector, and a pump 30 in the fuel line supplying the necessary fuel flow.

According to the present invention the outlet conduit 24 associated with the power take-off is extended and is connected to a pressure operated valve 32 installed in the fuel line 26. More particularly, valve 32 includes a valve housing 34 in which is slidably mounted a valve core 36 having a head thereon. Core 36 extends into a cylinder 40 on the valve housing 34 and carries a piston head or plunger 42 operable in the cylinder. A compression spring 44 is mounted on the core 36 and urges the latter to the left which comprises a valve position providing normal fuel flow through the fuel line 26.

Leading from the valve housing 34 and connected back into the fuel line 26 is an auxiliary or by-pass fuel line 46 in which is incorporated a fuel flow meter 48. The connections of fuel lines 26 and 46 to the valve housing are such that when the valve core assembly is in a left-hand position, normal fuel flow will occur through the fuel line 26 but when the core assembly is moved to the right fuel will be directed through auxiliary fuel line 46 and thus have metered flow.

Thus, when the power take-off 10 of the vehicle is inoperative a normal, non-metered fuel flow occurs, but when the power take-off is activated, the fluid pressure thereof provides for automatic shifting of the valve core assembly to cause a metered flow of fuel used. The system of FIG. 1 can be used therefore in those instances where the vehicle is stopped or otherwise consumes fuel to operate mechanism from its power take-off.

It is to be understood that the valve core 36 may be operated by systems other than by power take-off systems such as by fluid or mechanical operated emergency brake systems. It is assumed in the system of FIG. 1 that the power take-off emergency brake mechanism 10 is operated mechanically or by fluid pressure, but it is to be understood that the valve 32 with a reversed positioning could be operated by vacuum if the power take-off or emergency brake were vacuum powered.

Figure 2:
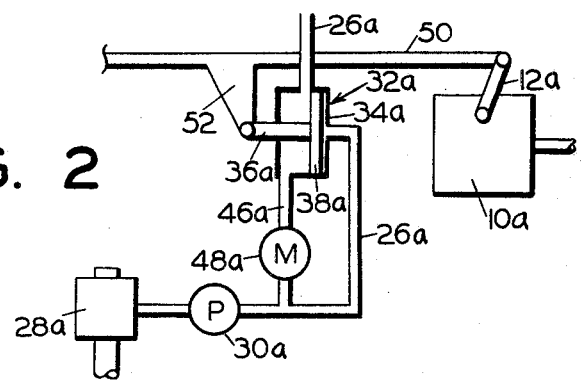
FIG. 2 is a diagrammatic view showing valve mechanism of the present system operated by manually shiftable vehicle operating control means.

FIG. 2 illustrates features of the present invention as associated with a mechanically or manually operated power take-off or emergency brake means 10a. In this structure the operating lever 12a is pivotally connected to a link 50 which operates the valve 32a. The fuel system is substantially identical to FIG. 1, wherein there is employed a fuel line 26a, a fuel mixing device 28a, a fuel pump 30a, and an auxiliary or by-pass fuel line 46a having a fuel flow meter 48a therein. In this structure, however, the valve core 36a, although having a head 38a on one end thereof, is elongated and is mechanically connected to the link 50 at its other end by means of a lug 52 on said link, whereby upon mechanical activation of the power take-off or the emergency brake 10a, as the case may be, the valve is operable to meter fuel consumption. That is, in normal operation of the vehicle the core 36a assumes a left position and fuel flows to the fuel mixing device 28a around the meter. When the power take-off or emergency brake 10a is applied the valve shifts the flow of fuel through the meter.

Figure 3:
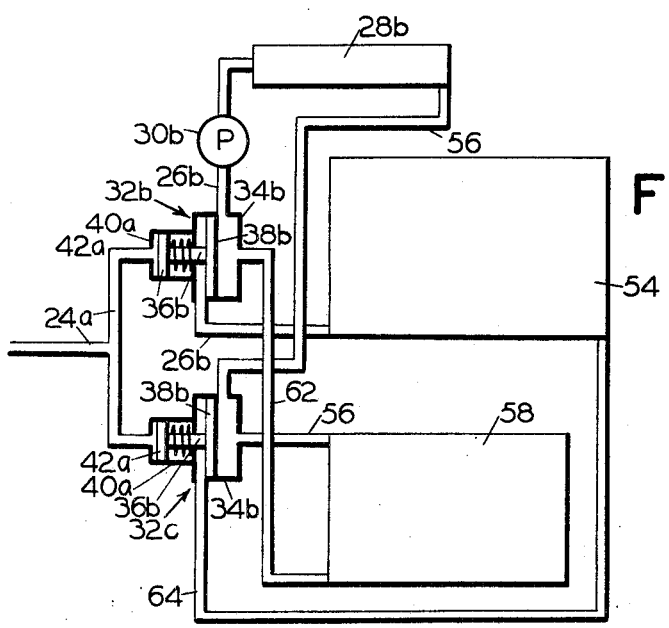
FIG. 3 is a diagrammatic view of a fuel measuring system of the present invention as assoicated with a diesel engine provided with a return flow for unburned fuel.

FIG. 3 illustrates features of the present invention as associated with a fuel system for diesel engines wherein means are provided for returning unused fuel from the injector. The injector is designated by the numeral 28b and has an infeed fuel line 26b leading from a main fuel tank 54 and incorporating the usual pump 30b therein. In this system, a return fuel line 56 extends from the injector 28b and feeds into main fuel tank 54. Incorporated in the present system are two valves 32b and 32c each comprising a valve housing 34b and a core assembly 36b having a head 38b slidably mounted in their respective valve housings. Valve cores 36b are operable in cylinders 40a and have piston heads or plungers 42a disposed in the cylinders. Cylinders 40a are connected to the vehicle pressure operated power take-off or emergency brake by conduits 24a whereby valve heads 38b are adapted to shift the flow of fuel as will be described more fully hereinafter. It is apparent that valve cores 36b are operated simultaneously, and further it is apparent that said valve cores may be operated mechanically as in FIG. 2.

Leading into valve 32b is a fuel line 62 from the auxiliary tank 58, and leading into the valve 32c is a return fuel line 64 from the main fuel tank 54.

The various fuel line connections with the valves 32b and 32c are such that when valve cores 36b are disosed in their right-hand position fuel flows from main fuel tank 54 through fuel line 26b and valve 32b to the injector 28b, and return flow is to the same tank through return fuel lines 56 and 64 and valve 32c. When the power take-off or emergency brake is actuated, the valve cores 36b are moved to their left-hand position, as shown, and fuel then flows from auxiliary fuel tank 58 through line 62, through the valve 32b, through fuel line 26b and into injector 28b. In this condition of the system, the return fuel flows through return fuel line 56, through the valve 32c, and then into the auxiliary fuel tank 58. The valves thus operate to cause a fuel flow from a main fuel tank 54 and a return flow to this same tank when the vehicle is normally operated on the road. When the power take-off or emergency brake is activated, the valves serve to provide fuel feed from the auxiliary tank 58 and return fuel flow to this same tank. In the arrangement of FIG. 3, the conduit 24a is connected into the power take-off or emergency brake system and illustrates that such system may comprise a vacuum system in that the valve cores 36b are moved by vacuum to their left-hand position when the power take-off or emergency brake is activated to cause feed and return of fuel from the auxiliary tank but otherwise are maintained at their right-hand position. Although this system does not employ a fluid flow meter, the non-taxable fuel consumption is readily determined by the input of fuel to auxiliary tank 58.

FIG. 4 illustrates a modification which also is associated with an injector 28c wherein non-burned fuel is returned, but in such system a single fuel tank is employed. In this system, a fuel tank 54a is adapted to feed to the injector 28c through a fuel line 26c having a by-pass line 69 connected therein forming two fuel line segments a first of which leads from the fuel tank 54a and a second of which leads to the injector 28c. A pump 30c is incorporated in the second segment of the fuel line 26c and a flow meter 48b is incorporated in the by-pass line 69. A return fuel line 56a extends from the injector back to the fuel tank 54a. Connected to the first segment of the fuel line 26c is a valve 32d, and incorporated in the return fuel line 56a is a valve 32e. As in FIG. 3, each of the valves has a core 36c having a head 38c disposed in the respective valve housings 34c. Valve cores 36c are operable in cylinders 40b and have piston heads or plungers 42b disposed in these cylinders. Cylinders 40b are connected to the vehicle pressure operated power take-off or emergency brake by conduits 24b whereby valve heads 38c are adapted to shift the flow of fuel when the power take-off or emergency brake is activated. These valve cores 36c are operated simultaneously and as in FIG. 3 could also be operated mechanically. Interconnected between the valves 32d and 32e is a conduit 66, and interconnected between conduit 66 and the second segment of the fuel line 26c is a conduit 68.

The fluid lines and conduits are connected into the valves 32d and 32e such that when the valve cores 36c are in a right hand or normal operating position of the vehicle, fuel is fed from the first fuel line segment 26c into conduit 68, and back into the second fuel line segment 26c on the injector side of the meter 48, whereby to bypass the latter. Return flow from the injector 28c moves through return fuel line 56a, through valve 32e, and into the tank 54a. When the power take-off or emergency brake is activated, the valve cores 36c are moved to their left-hand position, as shown in FIG. 4, and fuel from the tank flows through valve 32d, through metered line 69, and into the injector 28c. In this condition of the system, fuel is returned through return fuel line 56a and back to the injector 28c through valve 32e and conduits 66 and 68. By this arrangement, it is apparent that since the return flow of fuel is fed back into the injector, the additional fuel required from the tank 54a will comprise the actual fuel consumption of the engine, such fuel consumption being measured by the meter 48b.

In the embodiment of FIG. 5 there is employed a single fuel tank 54b which is arranged to feed fuel to the injector 28d by a fuel line 26d having a by-pass line 71 connected therein forming two fuel line segments a first of which leads from the fuel tank 54b and a second of which leads to the injector 28c. A pump 30d is incorporated in the second segment of the fuel line 26d and a flow meter 48c is incorporated in the by-pass line 71a. A return fuel line 56b extends between the injector 28d and the tank 54b. Connected to the first segment of the fuel line 26d is a first valve 32f, and incorporated in the return fuel lin 56b is a second valve 32g. Each of the valves 32f and 32g has a valve core 36d with a head 38d in the respective valve housings 34d. Valve cores 36d are operable in cylinders 40c and have piston heads or plungers 42c disposed in these cylinders. Cylinders 40c are connected to the vehicle pressure operated power take-off or emergency brake by conduits 24 whereby valve heads 38d are adapted to shift the flow of fuel when the power take-off or emergency brake is activated.

Leading from valve 32f is a conduit 70 which is connected at its other end into the second segment of the fuel line 26d. Leading from valve 32g is a conduit 72 which is connected at its other end into the return fuel line 56b on the tank side of the valve 32g. A fluid flow meter 48d is connected in the conduit 72.

The FIG. 5 embodiment is also shown as being operative with a vacuum system which activates the power take-off or emergency brake. Thus, when the power take-off or emergency brake is not in operation, as when the vehicle is operating on the road, the valve cores 36d are disposed in their right-hand position whereby fluid flows from tank 54b, through the first segment of fuel line 26d, through valve 32f, through conduit 70, and back into the second segment of fuel line 26d for feeding to the injector. Such fuel flow by-passes the meter 48c. In this condition of the system, non-burned fuel returns from the injector back into the tank 54b through the return fuel line 56b and valve 32g. When the power take-off or emergency brake is activated, the valve cores are moved to the position shown in FIG. 5 and fuel flows through the first segment of fuel line 26d, valve 32f, the metered line 71 and into the injector 28d. The unburned or return fuel flows through conduit 56b into valve 32g, conduit 72 and meter 48d, conduit 56b, and back into the tank. This system thus measures the flow of fuel into the injector and also the return flow. The actual fuel consumed therefore comprises a differential in reading of the two meters 48c and 48d. Thus, in the system, of FIG. 5, when the vehicle is operating on the road a non-metered flow of fuel exists, but when the power take-off or emergency brake is activated the fuel consumed by the vehicle engine is accurately measured.

It is to be understood that the valve 32b through 32g in FIGS. 3, 4 and 5 could be operated mechanically or by air or liquid, as well as by vacuum as illustrated. These valves could also be operated by electrical means in turn operated by the power take-off or emergency brake. In any event the valves would be of suitable structure to shift the flow of fluid for metering.

FIG. 6 illustrates another measuring system for determining non-taxable fuel that is consumed and is concerned with a vehicle employing two engines one of which serves to drive the vehicle on the road and the other of which serves to drive mechanism on the vehicle. It is assumed that the latter engine consumes non-taxable fuel. The numeral 28e designates the fuel mixing device for the vehicle driving engine, and the numeral 28f designates the fuel mixing device for the engine which consumes non-taxable fuel. The system employs a common fuel tank 54c from which extends a fuel line 74 leading to a branch fuel line 76 for the fuel mixing device 28e and a branch fuel line 78 leading to the fuel mixing device 28f. Each of the branch fuel lines 76 and 78 has a pump 30e incorporated therein and the fuel line 78 in addition has a fluid flow meter, 48e incorporated therein. By means of this system, any fuel flowing to the fuel mixing device 28f of the auxiliary engine is metered.

In accordance with the present invention there is thus provided means for measuring fuel consumption by vehicles which is used for non-highway use. Each of the embodiments employed provides for ready determination of such non-taxable fuel consumption, either by determination from a meter in the system or by measuring the input to a fuel tank which is operative only when the vehicle has non-taxable fuel consumption. It is to be understood that the invention may take other forms and all such modifications and variations which will occur to persons skilled in the art are included in the invention.

Having thus described my invention, I claim:

1. A fuel measuring system in combination with vehicle structure, comprising
   (a) a fuel tank,
   (b) a fuel mixing device of the type which discharges unburned fuel so that such unburned fuel can be returned to the engine for burning,
   (c) a fuel line extending between said fuel tank and said fuel mixing device,
   (d) a fuel return line extending from the fuel mixing device to said fuel tank to return the unburned fuel,
   (e) shiftable vehicle operating control means,
   (f) a by-pass fuel line connected to said fuel line for by-passing fuel around a portion of the latter,
   (g) flow metering means in said by-pass fuel line,
   (h) and fuel line valve means connected to said by-pass fuel line and said fuel line,
   (i) said valve means being operable connected to said shiftable vehicle operating control means and being movable between a pair of positions one of which provides normal flow of fuel through the fuel line and the other of which provides metered flow through said by-pass fuel line.

2. The fuel measuring system of claim 1 wherein said fuel return line has a first portion leading to said fuel tank and a second portion connected into said fuel line at a point upstream from said fuel mixing device and downstream from said flow metering means whereby the metered flow through said by-pass line comprises the actual fuel consumption of the vehicle engine when the return flow is through said second portion of the return line.

3. The fuel measuring system of claim 2 including second valve means connected in said return line for controlling the flow of return fluid through said return line.

4. The fuel measuring system of claim 2 including return line valve means connected in said return line for controlling the flow of return fluid through said first and second portions of the return line, said return line valve means being operable with said fuel line valve means such that upon a normal flow of fuel through said fuel line valve means the return line valve means directs return fuel through the first portion of said return line and that upon metered flow of fuel through said fuel line valve means the return line valve means directs return fuel through the second portion of said return line.

5. The fuel measuring system of claim 1 including
   (a) a by-pass line in said fuel return line,
   (b) flow metering means in the last mentioned by-pass line,
   (c) and return line valve means connected in said return line for controlling the flow of return fluid either directly through said return line or through said by-pass line therein,
   (d) said return line valve means being operable with said fuel line valve means such that upon a normal flow of fuel through said fuel line valve means, the return line valve means directs return fuel directly through the said return line to said tank and that upon metered flow of fuel through said fuel line valve means, the return line valve means directs return fuel through the by-pass line in said return line, whereby the differential of flow between said two flow metering means comprises the fuel consumed by the vehicle engine in the said other position of said fuel line valve means.

6. A fuel measuring system for use with a vehicle of the type having a fuel tank, a fuel mixing device of the type arranged to discharge unused fuel so that such unused fuel can be returned to the engine for burning, a fuel line extending between the fuel tank and the fuel mixing device, a fuel return line extending from the fuel mixing device to the fuel tank, and shiftable vehicle operating control means comprising
   (a) a by-pass fuel line arranged to be connected to said fuel line for by-passing fuel from the fuel tank around a portion of the fuel line,
   (b) flow metering means in said by-pass fuel line,
   (c) and fuel line valve means connected to said by-pass fuel line and arranged for connection to said fuel line, (d) said valve means being arranged to be operably connected to said shiftable vehicle operating control means and being movable between a pair of positions one of which provides normal flow of fuel through the fuel line and the other of which provides metered flow through said by-pass fuel line.

References Cited

UNITED STATES PATENTS 3,288,238  11/1966  Lindsey _____ 180—77

FOREIGN PATENTS 986,166  3/1965  Great Britain.

A. HARRY LEVY, Primary Examiner

U.S. Cl. X.R.

73—113